(12) United States Patent
Ward et al.

(10) Patent No.: US 9,870,172 B2
(45) Date of Patent: Jan. 16, 2018

(54) ADDRESS COLLISION AVOIDANCE IN A MEMORY DEVICE

(71) Applicant: Avago Technologies General IP (Singapore) Pte. Ltd., Singapore (SG)

(72) Inventors: Robert E. Ward, Colorado Springs, CO (US); Brian Lessard, Colorado Springs, CO (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 161 days.

(21) Appl. No.: 14/852,059

(22) Filed: Sep. 11, 2015

(65) Prior Publication Data

US 2017/0075823 A1    Mar. 16, 2017

(51) Int. Cl.

| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 12/14* | (2006.01) |
| *G06F 12/123* | (2016.01) |

(52) U.S. Cl.
CPC .......... *G06F 3/0659* (2013.01); *G06F 3/0619* (2013.01); *G06F 3/0679* (2013.01); *G06F 12/1416* (2013.01); *G06F 12/125* (2013.01); *G06F 2211/1085* (2013.01); *G06F 2212/1032* (2013.01); *G06F 2212/202* (2013.01)

(58) Field of Classification Search
CPC .............. G06F 12/1416; G06F 12/125; G06F 2212/1032; G06F 2212/202; G06F 3/0619; G06F 3/0659; G06F 3/0679; G06F 2211/1085
USPC ................. 711/150–152, 155, 158, 167–169
See application file for complete search history.

(56) References Cited

U.S. PATENT DOCUMENTS

| | | |
|---|---|---|
| 8,190,828 B1 | 5/2012 | May et al. |
| 2008/0235421 A1* | 9/2008 | Jayaratnam ......... G06F 13/1684 710/110 |
| 2014/0059301 A1* | 2/2014 | Rao ..................... G06F 11/1012 711/150 |
| 2014/0059304 A1 | 2/2014 | Iwai et al. |

OTHER PUBLICATIONS

Functional Description—HPC II Controller, Altera Corporation, Aug. 15, 2014.

* cited by examiner

*Primary Examiner* — Mark Giardino, Jr.
*Assistant Examiner* — Shane Woolwine
(74) *Attorney, Agent, or Firm* — Sheridan Ross P.C.

(57) ABSTRACT

Embodiments herein provide for avoiding address collisions in a memory device. In one embodiment, a memory controller includes a command scheduler operable to process a read-modify-write I/O command to a location in memory, to detect another I/O command to the same memory location while the read-modify-write I/O command is accessing the memory location, and to stall the other I/O command until the read-modify-write I/O command is complete while allowing a third I/O command to access the memory.

20 Claims, 6 Drawing Sheets

ADDRESS COLLISION AVOIDANCE IN A MEMORY DEVICE

FIELD

The invention generally relates to memory controllers.

BACKGROUND

A memory controller comprises logic that manages the flow of data going to and from memory. The memory controller can be configured as a separate device or integrated onto the memory device itself. In whatever form, the memory controller processes Input/Output (I/O) commands that address specific memory locations in the memory to read data from and write data to the memory. Depending on the command set of the memory controller, the I/O commands can implement write operations through different ways. For example, a read-modify-write I/O command directs the memory controller to read a memory location and then write a new value to that location at once, either with a completely new value or some function of the previous value. In some instances, multiple devices may attempt to write to a same location in the memory through the memory controller at the same time. This is generally referred to as an address collision and can corrupt data within the memory.

BRIEF DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Figure 1:
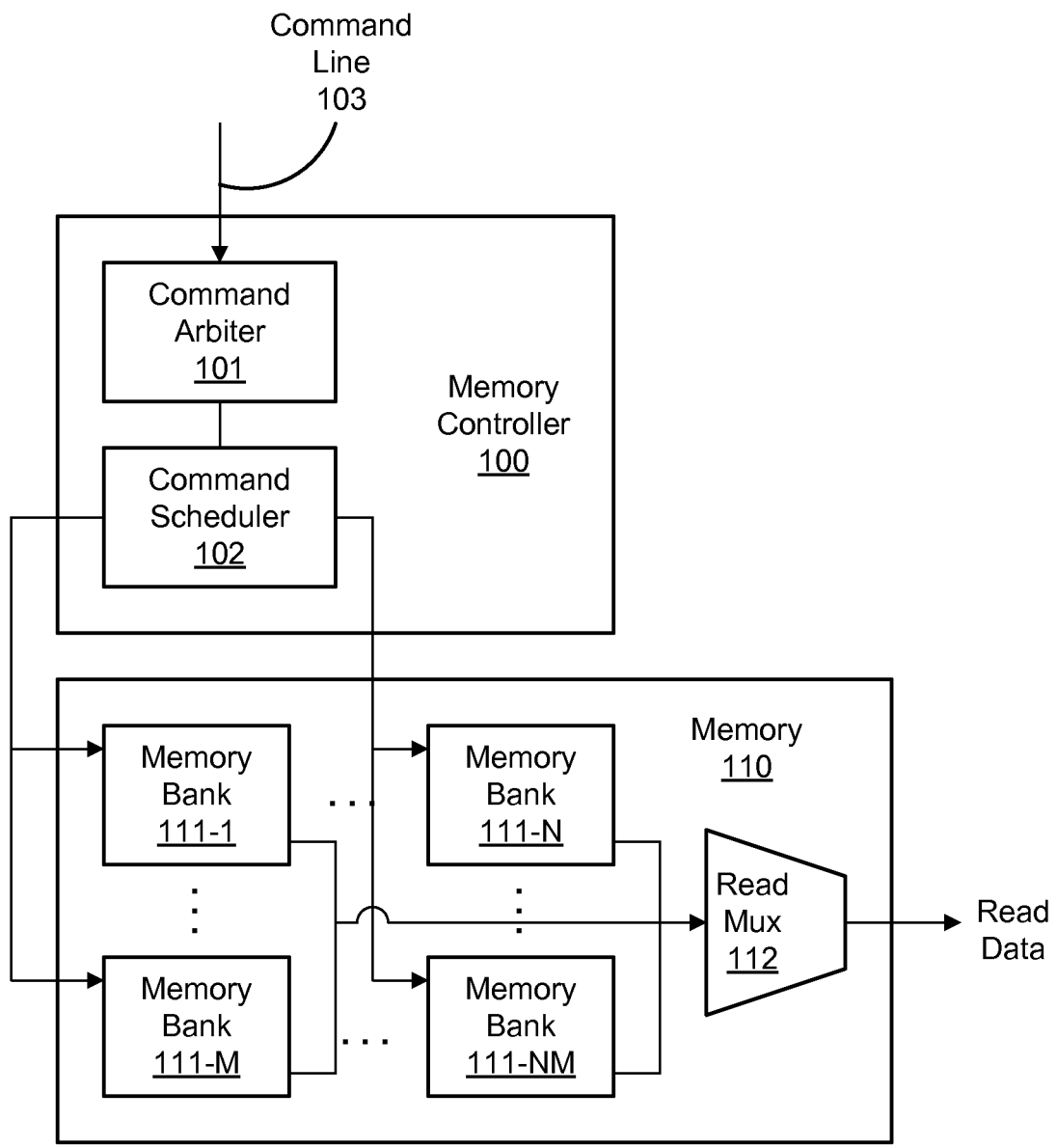
FIG. 1 is a block diagram of an exemplary memory controller.

FIG. 1 is a block diagram of an exemplary memory controller 100. The memory controller 100 is any device, system, software, or combination thereof operable to process I/O commands (e.g., through a command line 103) to access memory locations in the memory 110 for read and write operations. In processing the I/O commands, the memory controller 100 determines an address within each I/O command that directs the read/write operation to a specific location in one of the memory banks 111-1-111-NM (where the reference numbers "N" and "M" merely represent integers greater than "1" and not necessarily equal to any other "N" and "M" designated herein).

The memory controller 100 includes a command arbiter 101 that is operable to determine the order in which the I/O commands are processed. The memory controller 100 also includes a command scheduler 102 that is communicatively coupled to the command arbiter 101 and is operable to "load" the I/O commands in the order that they are received so as to process the various read/write operations of the commands. For example, the command scheduler 102 may load a write I/O command that writes to a specific address in one of the memory banks 111. Then, the command scheduler 102 may load a read I/O command that reads from a specific address of the memory banks 111. Once read, the data is output from the memory 110 through a read multiplexer 112. Another example of an operation that may be formed via the I/O commands includes a read-modify-write operation that reads data from a location in the memory 110. The read-modify-write operation then writes a new value at that location either with a completely new value or some function of the previous value, as mentioned. In some embodiments, it takes six clock cycles to modify perform the read-modify-write operation.

While the command arbiter 101 and the command scheduler 102 are often implemented in firmware, the logic associated with each of these components may be implemented in a variety ways as a matter of design choice, including software, hardware, firmware, or combinations thereof. Additionally, the command arbiter 101 and the command scheduler 102 may be configured "on-chip" with the memory 110. Some examples of the memory 110 include static random access memory (SRAM) and dynamic random access memory (DRAM).

Figure 2:
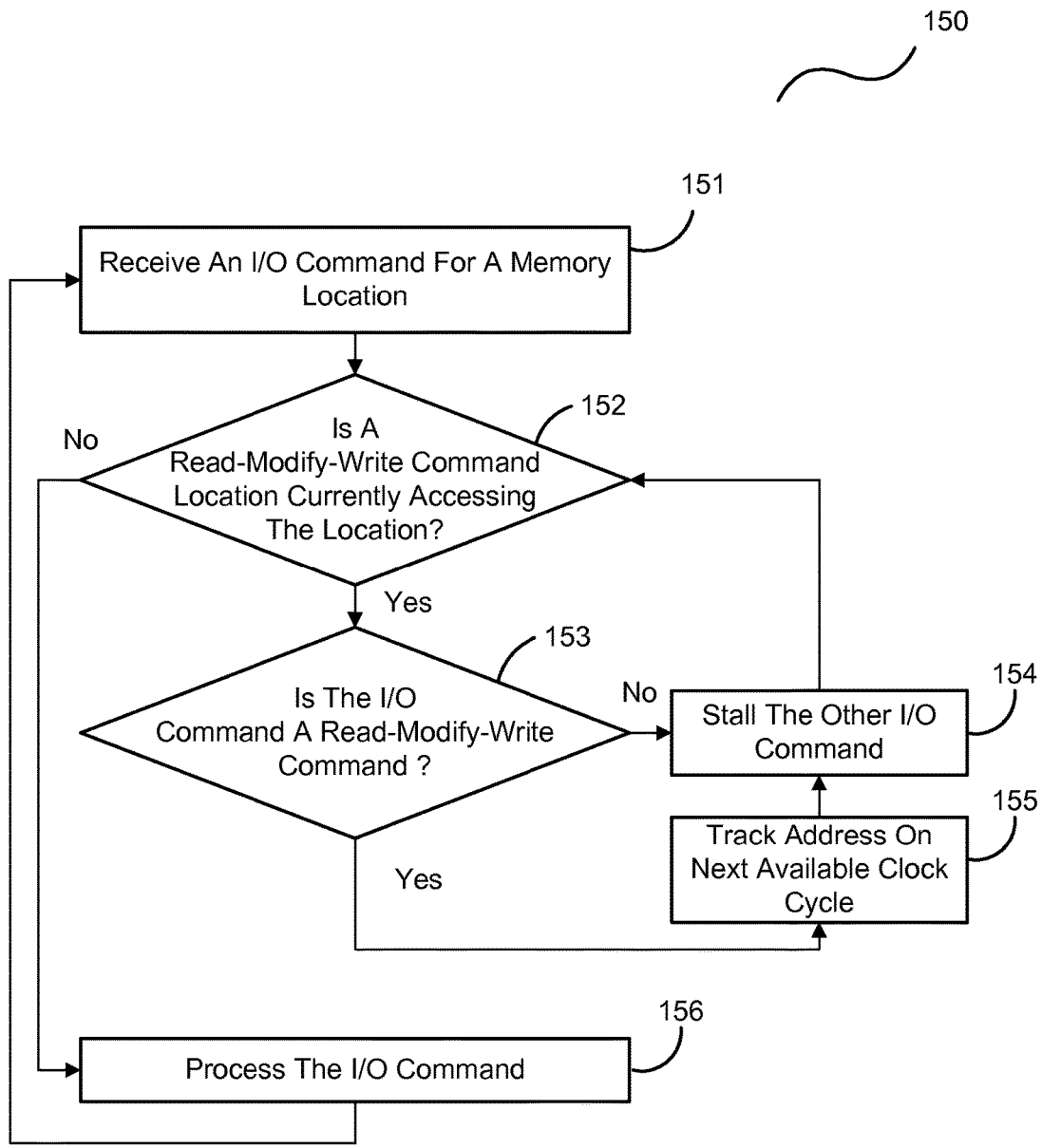
FIG. 2 is a flowchart of an exemplary process of the memory controller of FIG. 1.

FIG. 2 is a flowchart of an exemplary process 150 of the memory controller 100 of FIG. 1. In this embodiment, it should be assumed that the memory controller 100 is operational and currently processing I/O commands. In this regard, the command arbiter 101 receives an I/O command for a memory location at one of the memory banks 111 in the memory 110 to perform a particular I/O operation, in the process element 151. As multiple I/O commands may be received at or about the same time (e.g., from multiple "master" devices), the command arbiter 101 determines the order in which the I/O commands are to be serviced by the command scheduler 102.

In the process element 152, the command scheduler 102 detects the I/O command from the command arbiter 101 and determines whether that I/O command is directed to a memory location currently being accessed by a read-modify-write operation of a previous I/O command. For example, the command scheduler 102 may determine the address of a pending I/O command and then compare that address to an address of the previous I/O command implementing the read-modify-write operation. If the addresses are different, the command scheduler 102 processes the I/O command to access the addressed memory location with the I/O operation of the I/O command, in the process element 156, while the previous I/O command is being processed.

If, however, the subsequent I/O command comprises the same address, then the command scheduler 102 determines whether the I/O command is a read-modify-write operation, in the process element 153. If the I/O command does comprise a read-modify-write operation to the same location in the memory 110 as the previous I/O command, the command scheduler 102 tracks the address of the subsequent read-modify-write I/O command on the next available clock cycle, in the process element 155, and then stalls the I/O command until the previous read-modify-write I/O command is complete, in the process element 154. Otherwise, the command scheduler 102 stalls the subsequent I/O command (e.g., the event of a read I/O command or a write I/O command) until the previous "in-progress" read-modify-write I/O command is complete, in the process element 154. Once the in-progress read-modify-write I/O command is finished accessing the location memory, the command scheduler 102 can process the next I/O command to the same address of the just finished read-modify-write operation, in the process element 156.

Figure 3:
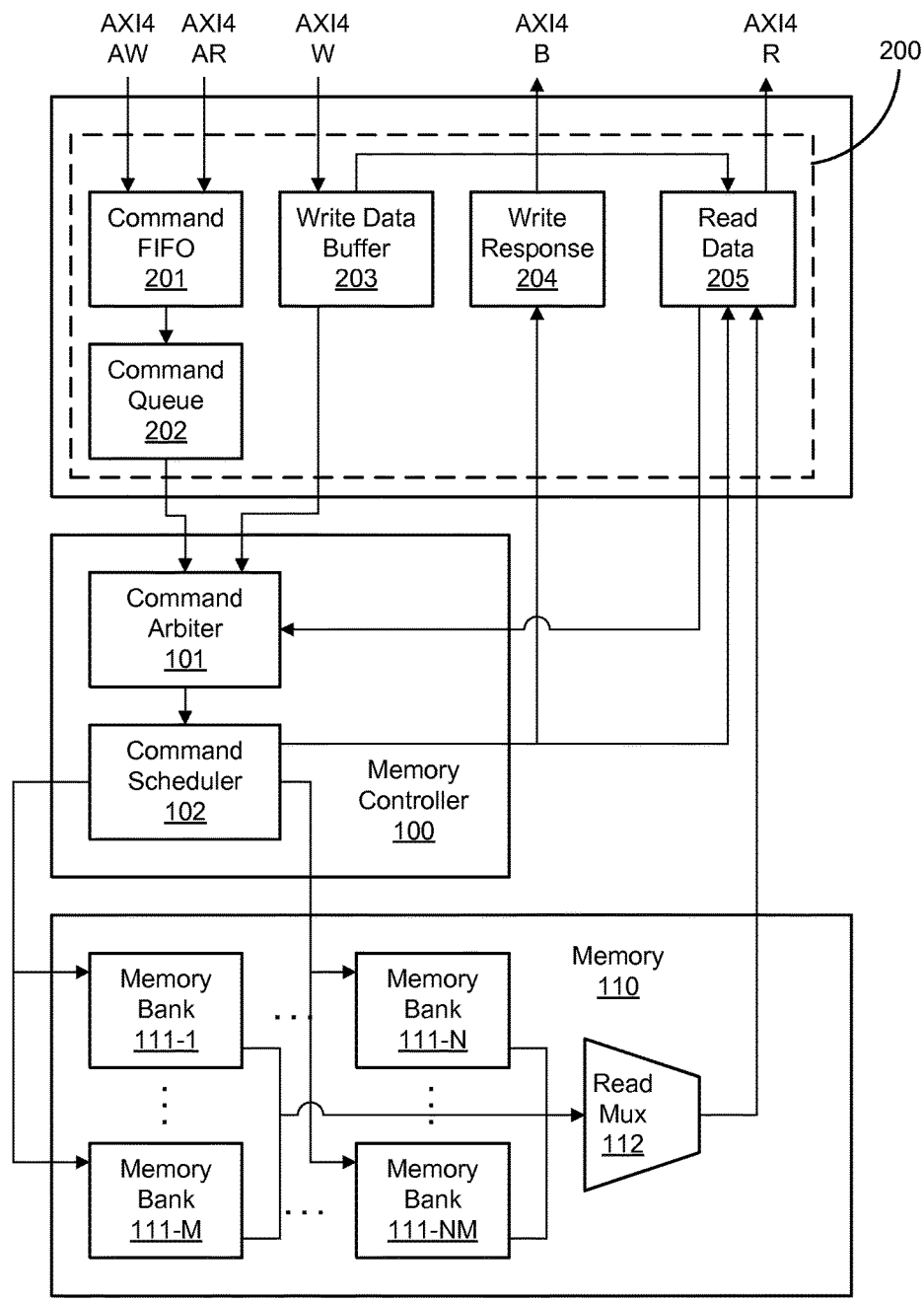
FIG. 3 is a block diagram of another exemplary memory controller.

FIG. 3 is a block diagram of another exemplary memory controller 100. In this embodiment, the memory controller 100 is integrated "on chip" with the memory 110 and configured with slave logic 200 in an ARM Advanced Microcontroller Bus Architecture (AMBA). The slave logic 200 uses Advanced eXtensible Interface (AXI) 4, the fourth generation of the AMBA interface specification, to interface with a plurality of master I/O devices (not shown). The slave logic 200 comprises, among other things, a command FIFO (First In First Out) buffer 201, a write data buffer 203, write response logic 204, a read data controller 205, and a command queue 202.

The command FIFO buffer 201 is operable to receive and buffer read I/O commands (via an AXI4 AR interface) and various forms of write I/O commands (via an AXI4 AW interface), including I/O commands that perform read-modify-write operations. Data associated with the write commands is processed through the write data buffer 203 (via an AXI4 W interface). The I/O commands are queued for processing in the command queue 202. Once a write I/O command is processed and the data is written to the memory 110, the write response logic 204 replies to the appropriate master device issuing the I/O command (via an AXI4 B interface). Similarly, when a read I/O command is processed and the data is read from the memory 110, the data is transferred from the memory 110 (via the read multiplexer 112) to the appropriate master device issuing the I/O command (via an AXI4 R interface).

The command FIFO buffer 201 is operable to receive I/O commands from the master devices such that they may be processed in the order that they are received. Each of the I/O commands comprises an identification (ID) assigned by its originating master device. The command queue 202 is operable to determine the IDs of the I/O commands so as to prevent ID collisions.

For example, master devices assign IDs to each of the I/O commands issued to the memory device. As master devices generally do not keep track of how other master devices assign IDs, the command FIFO buffer 201 is likely to receive I/O commands with the same ID. The command queue 202 thus extracts IDs from each of the I/O commands received and determines whether any given ID exists with an I/O command presently being processed. If an I/O command with the same ID is being processed, the command queue 202 stalls the later I/O command until the in-progress I/O command is complete.

In other words, the command queue 202 is operable to receive a first I/O command from a first master device while a second I/O command is presently operating on data in the memory 110. The second I/O command is from a second different master device but has the same ID as the first I/O command. The command queue 202 stalls the first I/O command until the second I/O command is complete. In the meantime, the command queue 202 tracks the ID of the second I/O command until the second I/O command is complete. But, other I/O commands with IDs that differ from the IDs being tracked are allowed to be processed by the memory controller 100.

Figure 4:
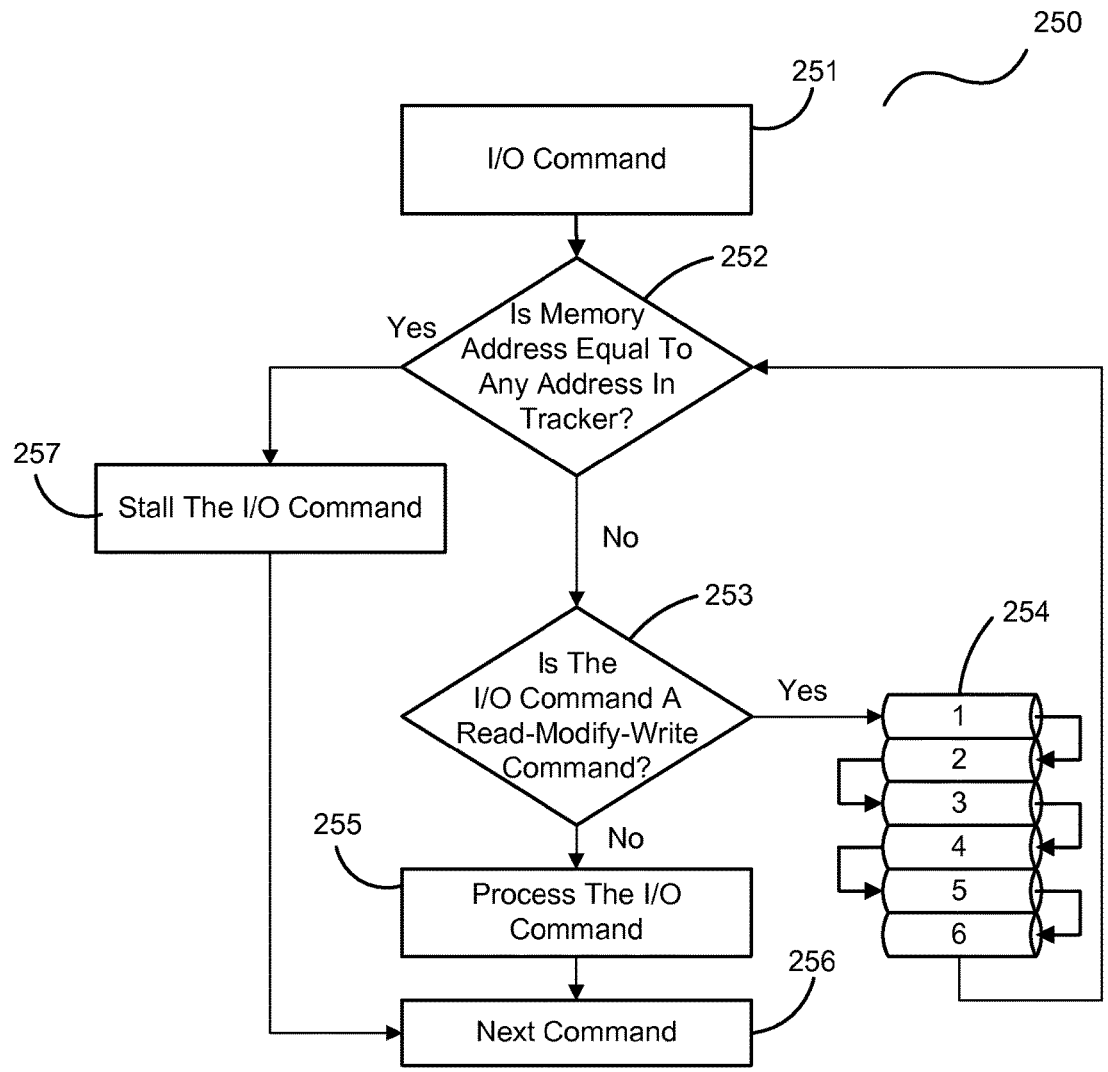
FIG. 4 is a flowchart exemplarily illustrating clock cycle looping for collision avoidance.

FIG. 4 is a flowchart of a process 250 exemplarily illustrating address tracking on a clock cycle basis for address collision avoidance. In this embodiment, an address tracker 254 maintains the tracking of memory addresses to ensure that memory locations are not being accessed by multiple I/O commands at the same time. Generally, the address tracker 254 is configured with a number of address buffers that is equal to the number of clock cycles it takes for an I/O command to complete. As exemplarily illustrated, the address tracker 254 in this embodiment has six address buffers 1-6 corresponding to the number of clock cycles it would take for a read-modify-write operation to complete.

To illustrate, it should be assumed that the memory controller 100 is currently processing I/O commands. Thus, when an I/O command is received, in the process element 251, the command scheduler 102 determines whether the received I/O command comprises an operation directed to an address currently in the address tracker 254, in the process element 252. If the address of the I/O command is in the address tracker 254, the I/O command is placed in a state machine that stalls (i.e., the process element 257) the I/O command until the in-progress read-modify-write I/O command is complete and the address associated with that read-modify-write command is flushed from the address tracker 254. In the meantime, the command scheduler 102 schedules the next I/O command to perform another I/O operation, in the process element 256.

If the addresses are different, then the command scheduler 102 determines whether the pending I/O command is a read write modify command, in the process element 253. If so, the command scheduler 102 loads the address associated with the I/O command into the address tracker 254. From there, the command scheduler 102 will process the read-modify-write command, shifting the address in the address tracker 254 until the read-modify-write command is complete. As illustrated in this example, it will take six clock cycles for the command scheduler 102 to complete the read-modify-write I/O command. And with each clock cycle, the address associated with the read-modify-write command is moved through the address tracker 254. Thus, after the sixth clock cycle, the read-modify-write command is complete and the address associated with that command is flushed from the address tracker 254. And, when the read-modify-write I/O command is complete, the command scheduler 102 begins to process the next I/O command, in the process element 256.

It should be noted that, if an I/O command attempting to address a location of the memory 110 that is not being accessed by a read-modify-write command and the I/O command is not a read-modify-write command, then the I/O command is processed, in the process element 255, and the command scheduler 102 attempts to process the next I/O command, in the process element 251/256. It should also be noted that the embodiment illustrated herein is merely exemplary in that the number of address buffers in the address tracker 254 may be implemented on the fly so as to allow for variations in the number of clock cycles needed to perform certain I/Os. Accordingly, the invention is not intended to be limited to any of the exemplary embodiments illustrated and described herein.

Figure 5:
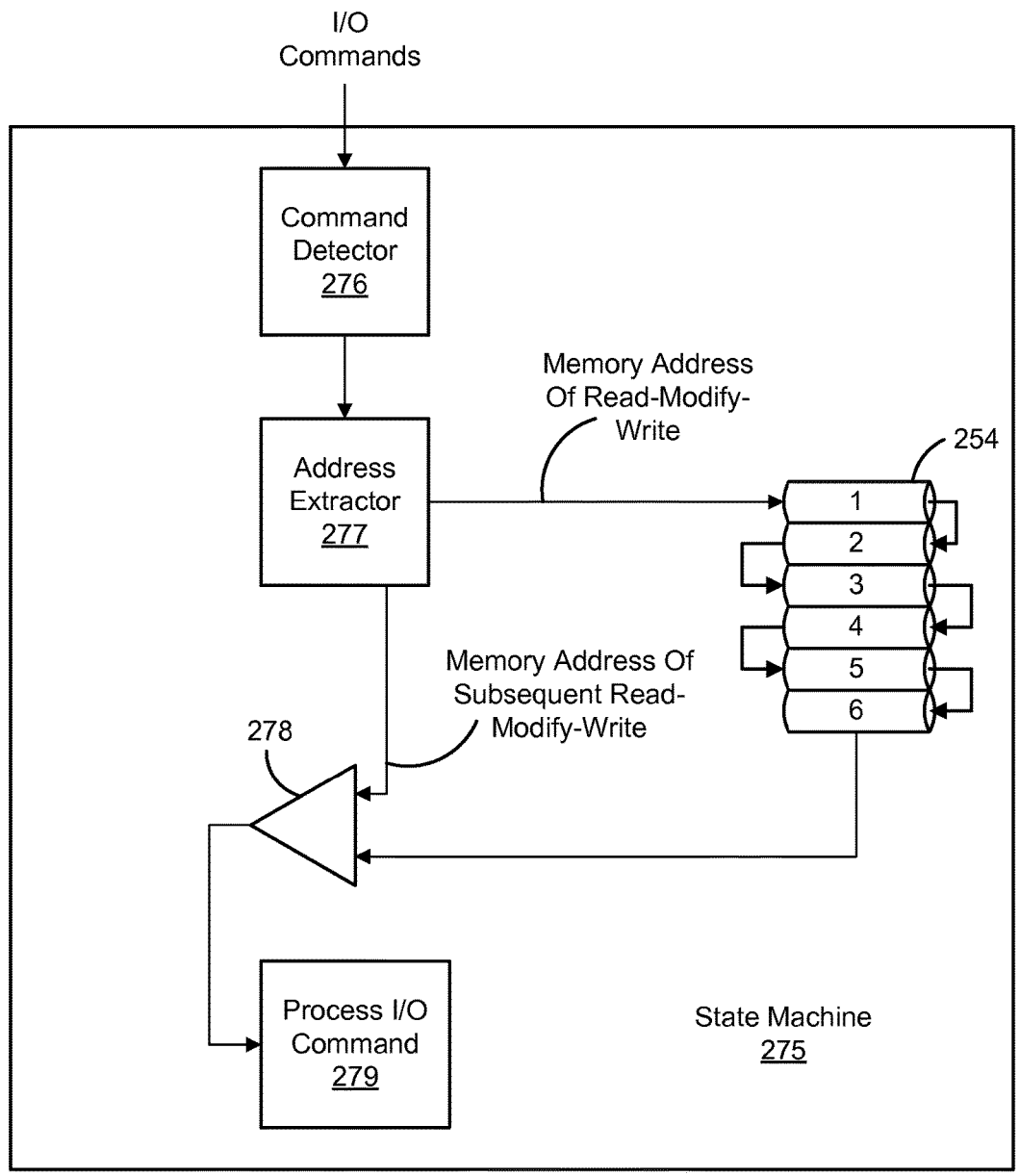
FIG. 5 is an exemplary state machine operable with the memory controller of FIG. 1.

FIG. 5 is an exemplary state machine 275 operable with the memory controller 100 of FIG. 1. The state machine 275 is generally operable within the command scheduler 102 and comprises logic 276 that is operable to detect an incoming I/O command. The command scheduler 100 and to also comprises logic 277 that extracts addresses from the incoming I/O command. If the I/O command is a read-modify-write I/O command, as described above, the address is loaded into the address tracker 254. Thus, when another I/O command enters the command scheduler 102 for processing, the address of the other I/O command can be compared to the address in the address tracker 254 via the comparator 278. And, if the addresses do not match, the command scheduler processes the I/O command via the logic 279.

In one embodiment, the address extractor 277 loads the address of a desired location of the memory 110 for any given read-modify-write I/O command into each of the address buffers of the address tracker 254. For example, if an incoming I/O command comprises a read-modify-write operation, the address extractor 277 extracts the address associated with the read-modify-write operation of the I/O command and loads that address into each of the six address buffers and the address tracker 254. Then, on each successive clock cycle, the address is flushed from one of the address buffers until the read-modify-write operation is complete and the address tracker 254 is completely flushed of the address. In this regard, the command scheduler 102 can load a new address associated with another read-modify-write I/O command on the next available clock cycle so as to queue the next read-modify-write operation.

To illustrate, assume that a read-modify-write operation of an I/O command is attempting to access data at a memory location having an address 0x0001. The address 0x0001 is then loaded into each of the six buffers of the address tracker 254. As the read-modify-write operation progresses, the buffers are flushed one by one with each clock cycle. Thus, in this example, the address buffer 1 is flushed on the first clock cycle, the address buffer 2 is flushed on the second clock cycle, and so on. And on the sixth clock cycle, the address is flushed from the address tracker 254.

Figure 6:
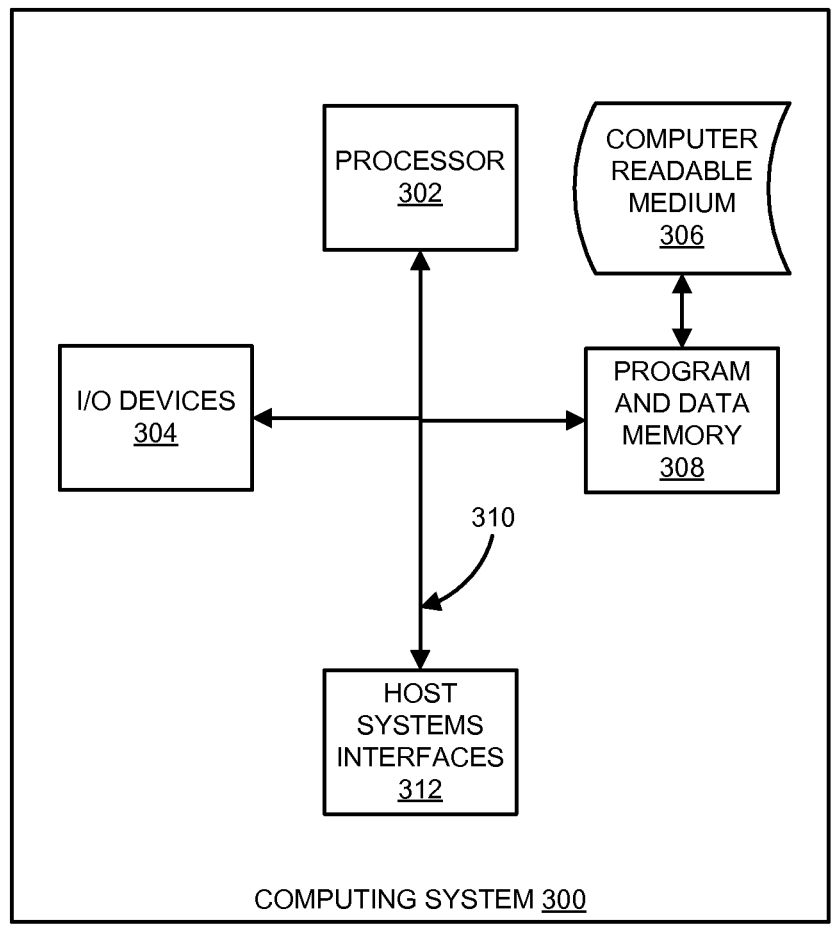
FIG. 6 illustrates an exemplary computer system operable to execute programmed instructions to perform desired functions.

The invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 6 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Some examples of optical disks include compact disk-read only memory (CD-ROM), compact disk-read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems, cable modem and Ethernet cards are just a few of the currently available types of network adapters.

What is claimed is:
1. A memory controller, comprising:
a command scheduler operable to process a first read-modify-write Input/Output (I/O) command to a memory location, to detect another I/O command to the same memory location while the first read-modify-write I/O command is accessing the memory location, to extract and track a memory address from the another I/O command if the another I/O command is a read-modify-write I/O command and to not extract and not track the memory address from the another I/O command if the another I/O command is not a read-modify-write command, and to stall the another I/O command until the first read-modify-write I/O command is complete while allowing a third I/O command to access the memory.
2. The memory controller of claim 1, wherein:
the I/O commands are Advanced eXtensible Interface (AXI) I/O commands.
3. The memory controller of claim 1, wherein:
the command scheduler is further operable to extract a memory address of the from the first read-modify-write I/O command, and to track the memory address of the first read-modify-write I/O command until the first read-modify-write I/O command is complete.
4. The memory controller of claim 3, wherein:
the command scheduler further comprises a state machine that is operable to extract the memory address of the another I/O command while the first read-modify-write I/O command is processing, and to compare the memory address of the another I/O command to the memory address extracted from the first read-modify-write I/O command.
5. The memory controller of claim 3, further comprising:
an address buffer operable to retain the memory address of the first read-modify-write I/O command for a same number of clock cycles as used to complete the first read-modify-write I/O command, and flush the memory address of the first read-modify-write I/O command upon completion of the first read-modify-write I/O command.
6. The memory controller of claim 1, wherein:
the first read-modify-write I/O command is received from a first master device and comprises a first identification (ID);

the memory is a static random access memory (SRAM) memory configured on a chip;

the memory controller is configured on the chip with the SRAM memory; and the chip further comprises a slave interface operable to determine the ID of the first read-modify-write I/O command, to determine that the another I/O command is from a second master device and has a same ID as the first read-modify-write I/O command, and to stall the another I/O command until the first read-modify-write I/O command is complete while allowing the third I/O command to access the memory.

7. The memory controller of claim 1, further comprising:

a command arbiter operable to process the I/O commands from a plurality of master components, and to decide, on a clock-cycle by clock-cycle basis, which I/O command will access the memory.

8. A method operable in a memory controller, the method comprising:

modifying data at a first location in memory with a first read-modify-write Input/Output (I/O) command;

detecting a second I/O command to the first location in the memory while the first read-modify-write command is modifying the data;

extracting and tracking a memory address from the second I/O command if the second I/O command is a read-modify-write I/O command and not extracting and not tracking the memory address from the second I/O command if the second I/O command is not a read-modify-write I/O command;

stalling the second I/O command until the first read-modify-write I/O command is complete;

detecting a third I/O command to a second different location in the memory while the first read-modify-write I/O command is modifying the data; and allowing the third I/O command to access the second location in the memory while the first read-modify-write I/O command is modifying the data.

9. The method of claim 8, further comprising:

detecting the second I/O command on a clock cycle that is subsequent to a clock cycle when the first read-modify-write I/O command is detected, wherein the third I/O command is a read I/O command or a write I/O command.

10. The method of claim 8, wherein:

the I/O commands are Advanced eXtensible Interface (AXI) I/O commands.

11. The method of claim 8, further comprising:

extracting a memory address from the first read-modify-write I/O command; and tracking the memory address of the first read-modify-write I/O command until the first read-modify-write I/O command is complete.

12. The method of claim 11, further comprising:

comparing the memory address of the second I/O command to the memory address extracted from the first read-modify-write I/O command, wherein the extracting the memory address from the second I/O command occurs while the first read-modify-write I/O command is processing.

13. The method of claim 11, further comprising:

retaining the memory address of the first read-modify-write I/O command for a same number of clock cycles as used to complete the first read-modify-write I/O command.

14. The method of claim 8, wherein:

the first read-modify-write I/O command is received from a first master device and comprises a first identification (ID);

the memory is a static random access memory (SRAM) memory configured on a chip;

the memory controller is configured on the chip with the SRAM memory; and the method further comprises:

determining the ID of the first read-modify-write I/O command;

determining that the second I/O command is from a second master device and has a same ID as the first read-modify-write I/O command; and stalling the second I/O command until the first read-modify-write I/O command is complete while allowing the third I/O command to access the memory.

15. A non-transitory computer readable medium comprising instructions that, when executed by a memory controller, direct the memory controller to:

modify data at a first location in memory with a first read-modify-write Input/Output (I/O) command;

detect a second I/O command to the first location in the memory while the first read-modify-write command is modifying the data;

extract and track a memory address from the second I/O command if the second I/O command is a read-modify-write I/O command and not extract and not track of the memory address from the second I/O command if the second I/O command is not a read-modify-write I/O command;

stall the second I/O command until the first read-modify-write I/O command is complete;

detect a third I/O command to a second different location in the memory while first the read-modify-write I/O command is modifying the data; and allow the third I/O command to access the second location in the memory while the first read-modify-write I/O command is modifying the data.

16. The computer readable medium of claim 15, further comprising instructions that direct the memory controller to:

detect the second I/O command on a clock cycle that is subsequent to a clock cycle when the first read-modify-write I/O command is detected.

17. The computer readable medium of claim 15, further comprising instructions that direct the memory controller to:

extract a memory address of from the first read-modify-write I/O command; and track the memory address of the first read-modify-write I/O command until the first read-modify-write I/O command is complete.

18. The computer readable medium of claim 17, further comprising instructions that direct the memory controller to:

extract the memory address of the second I/O command while the first read-modify-write I/O command is processing; and compare the memory address of the second I/O command to the memory address extracted from the first read-modify-write I/O command.

19. The computer readable medium of claim 17, further comprising instructions that direct the memory controller to:

retain, in one or more buffers, the memory address of the first read-modify-write I/O command for a same number of clock cycles as used to complete the first read-modify-write I/O command, wherein the instructions direct the memory controller to flush one buffer per clock cycle while processing the first read-modify-write I/O command so that the one or more buffers are completely flushed of the memory address of the first read-modify-write I/O command when the first read-modify-write I/O command is complete.

20. The computer readable medium of claim 15, wherein:
the first read-modify-write I/O command is received from a first master device and comprises a first identification (ID);
the memory is a static random access memory (SRAM) configured on a chip;
the memory controller is configured on the chip with the SRAM memory; and
the computer readable medium further comprises instructions that direct the memory controller to:
  determine the ID of the first read-modify-write I/O command;
  determine that the second I/O command is from a second master device and has a same ID as the first read-modify-write I/O command; and
  stall the second I/O command until the first read-modify-write I/O command is complete while allowing the third I/O command to access the memory.

* * * * *